United States Patent
Okamoto et al.

(10) Patent No.: US 11,333,055 B2
(45) Date of Patent: May 17, 2022

(54) CATALYST DETERIORATION DIAGNOSIS METHOD AND CATALYST DETERIORATION DIAGNOSIS SYSTEM

(71) Applicant: NGK INSULATORS, LTD., Nagoya (JP)

(72) Inventors: Taku Okamoto, Nagoya (JP); Osamu Nakasone, Inabe (JP)

(73) Assignee: NGK INSULATORS, LTD., Nagoya (JP)

( * ) Notice: Subject to any disclaimer, the term of this patent is extended or adjusted under 35 U.S.C. 154(b) by 340 days.

(21) Appl. No.: 16/555,005

(22) Filed: Aug. 29, 2019

(65) Prior Publication Data

US 2020/0080459 A1 Mar. 12, 2020

(30) Foreign Application Priority Data

Sep. 7, 2018 (JP) .............................. JP2018-167739

(51) Int. Cl.
*F01N 11/00* (2006.01)
*B01D 53/94* (2006.01)
(Continued)

(52) U.S. Cl.
CPC .......... *F01N 11/00* (2013.01); *B01D 53/9454* (2013.01); *F01N 3/101* (2013.01);
(Continued)

(58) Field of Classification Search
CPC .... F01N 3/101; F01N 11/00; F01N 2560/021; F01N 2560/026; F01N 2900/0416;
(Continued)

(56) References Cited

U.S. PATENT DOCUMENTS

2007/0199309 A1* 8/2007 Yano .................. B01D 53/9495
60/286
2013/0255233 A1* 10/2013 Yasui ....................... F01N 3/10
60/286

(Continued)

FOREIGN PATENT DOCUMENTS

DE 10 2004 061 603 A1 7/2006
DE 10 2013 211 521 A1 1/2014
(Continued)

OTHER PUBLICATIONS

Unexamined U.S. Appl. No. 16/555,003, filed Aug. 29, 2019.
German Office Action received in corresponding German Application No. 10 2019 006 115.2 dated Sep. 6, 2021.

*Primary Examiner* — Audrey B. Walter
(74) *Attorney, Agent, or Firm* — Mattingly & Malur, PC (57) ABSTRACT

A catalyst deterioration diagnosis method is a method for a system. The system includes a stepped transmission or a continuously variable transmission connected to an internal combustion engine, a catalyst into which an exhaust gas from the internal combustion engine is introduced, and a gas sensor having sensitivity to ammonia that outputs a detection value corresponding to a component of an exhaust gas that has passed through the catalyst. The catalyst deterioration diagnosis method includes the following steps. Monitoring of temporary increase of a detection value of the gas sensor is started, and thereby a temporarily increased amount of the detection value of the gas sensor is acquired. The monitoring is started when upshifting of the stepped transmission or pseudo-upshifting of the continuously variable transmission is performed. Whether or not the temporarily increased amount is larger than a threshold amount is determined.

14 Claims, 7 Drawing Sheets

(51) Int. Cl.
*F02D 41/14* (2006.01)
*F01N 3/10* (2006.01)
*G01M 15/10* (2006.01)

(52) U.S. Cl.
CPC ....... F02D 41/1463 (2013.01); G01M 15/102 (2013.01); *F01N 2560/021* (2013.01); *F01N 2560/026* (2013.01); *F01N 2900/0416* (2013.01); *F01N 2900/1616* (2013.01); *F02D 2041/1468* (2013.01)

(58) Field of Classification Search
CPC ......... F01N 2900/1616; B01D 53/9454; F02D 41/1463; G01M 15/102
See application file for complete search history.

(56) References Cited

U.S. PATENT DOCUMENTS

| | | |
|---|---|---|
| 2013/0330234 A1 | 12/2013 | Nakamura et al. |
| 2013/0340408 A1 | 12/2013 | Narayanaswamy et al. |

FOREIGN PATENT DOCUMENTS

| | | |
|---|---|---|
| DE | 10 2015 222 510 A1 | 6/2016 |
| GB | 2532774 A | 6/2016 |
| JP | 2004-138486 A | 5/2004 |
| JP | 2010-001781 A | 1/2010 |
| JP | 2012-219740 A | 11/2012 |

\* cited by examiner

CATALYST DETERIORATION DIAGNOSIS METHOD AND CATALYST DETERIORATION DIAGNOSIS SYSTEM

CROSS-REFERENCE TO RELATED APPLICATION

The present application claims priority from Japanese application JP2018-167739, filed on Sep. 7, 2018, the contents of which is hereby incorporated by reference into this application.

BACKGROUND OF THE INVENTION

Field of the Invention

The present invention relates to a catalyst deterioration diagnosis method and a catalyst deterioration diagnosis system, and more particularly to a catalyst deterioration diagnosis method and a catalyst deterioration diagnosis system for a catalyst into which an exhaust gas from an internal combustion engine is introduced.

Description of the Background Art

A gasoline engine emits an exhaust gas containing toxic substances, namely, nitrogen oxide (NOx), total hydrocarbon (THC), and carbon monoxide (CO). A catalyst that collectively removes these three contained substances, i.e., a three way catalyst (TWC), is mounted in many gasoline engine vehicles. The three way catalyst has a honeycomb structure. The honeycomb structure mainly includes a part made of ceramics of ceria ($CeO_2$), and a part made of precious metal such as platinum (Pt), palladium (Pd), and rhodium (Rh). Pt and Pd are mainly used to change HC and CO into carbon dioxide ($CO_2$) and water ($H_2O$) through oxidation. Rh is mainly used to reduce NOx. Ceria is used to cause absorption and elimination of oxygen ($O_2$).

A TWC for a gasoline engine is required to store oxygen, which is necessary for oxidizing HC and CO, while an oxygen content in an exhaust gas is high. This is because a gasoline engine is operated mainly with reference to a stoichiometric state and therefore an exhaust gas from a gasoline engine usually has a low oxygen content, unlike an exhaust gas from a diesel engine.

In recent years, on-board diagnostics (OBD) is in some cases conducted on a vehicle (typically, an automobile), as required by law. According to OBD, a diagnosis for a malfunction is conducted by means of functions provided in a vehicle itself. When a malfunction is detected, a driver may be warned.

OBD for a TWC may be conducted with an oxygen storage capacity (OSC) method, for example. In the OSC method, a specific surface area of ceria in a TWC is indirectly measured by using $O_2$ sensors provided on an upstream side and a downstream side of a TWC. An air/fuel (A/F) sensor of a limiting current type is usually provided on an upstream side of a TWC, i.e., at a position between an engine and a TWC, in order to measure an air-fuel ratio. The A/F sensor of a limiting current type is a type of $O_2$ sensor. An $O_2$ sensor of a voltage type is usually provided on a downstream side of a TWC, i.e., at a position between a TWC and an exhaust port.

In the OSC method, from a stoichiometric state to each of a lean state and a rich state, changes larger than those in usual cases are made. When an engine is brought into a lean state, oxygen concentration in an exhaust gas is increased. An $O_2$ sensor on an upstream side of a TWC starts to detect such concentration change in no time. At this time point, an $O_2$ sensor on a downstream side of the TWC is still detecting a stoichiometric state or a rich state. This is because ceria in the TWC absorbs oxygen in the exhaust gas. Since ceria can absorb a limited amount of oxygen, the $O_2$ sensor on a downstream side of the TWC also starts to detect the lean state after the elapse of a certain period of the lean state of the engine. After that, when the engine is brought into a rich state, the $O_2$ sensor on an upstream side of the TWC detects such change in no time. At this time point, the $O_2$ sensor on a downstream side of the TWC is still detecting the lean state. This is because ceria in the TWC releases oxygen. Since ceria releases a limited amount of oxygen, the $O_2$ sensor on a downstream side of the TWC also starts to detect the rich state after the elapse of a certain period of the rich state of the engine. After that, the engine is brought into a lean state again. Through such repeated state changes between a lean state and a rich state in the engine, time representing a difference in detection results of a rich state and a lean state between the $O_2$ sensor on an upstream side and the $O_2$ sensor on a downstream side is detected. Based on the detected time and a gas flow rate, a maximum value for an oxygen absorption amount of ceria is estimated. Based on the estimation, whether or not OSC of ceria is deteriorated is determined. When it is determined that OSC of ceria is deteriorated, a diagnosis result suggesting that the TWC is deteriorated is produced in OBD.

In a TWC, deterioration of a ceria part and deterioration of a precious metal part do not necessarily occur in a similar degree. Ceria is a promoter, and a main catalytic reaction is caused by a precious metal part. Therefore, to conduct a deterioration diagnosis of a TWC with high accuracy, it is desirable that deterioration of a precious metal part be more accurately evaluated. According to the OSC method described above, measurement is performed with regard to a ceria part, and is not performed with regard to a precious metal part. This may increase an error in estimating performance of a TWC.

Further, the OSC method is liable to be affected by a measurement error caused due to deterioration of the $O_2$ sensors on an upstream side and a downstream side of a TWC. Particularly, when the $O_2$ sensor on a downstream side of a TWC is of a voltage type, a difference may be produced in determination about a rich state and a lean state, due to hydrogen or the like adhering to a sensor electrode. Such a difference is liable to be affected by a composition of gasoline or engine oil, and therefore coping with the difference through correction is difficult. A determination error about a rich state and a lean state directly leads to a diagnosis error of the OSC method. Further, the $O_2$ sensor on a downstream side may wrongly determine that a state is closer to a rich state than an actual state, under influence of hydrogen or the like generated in a TWC. Further, when the engine is stopped for a long period, a large amount of $CO_2$ may be absorbed into a site where $O_2$ is supposed to be absorbed. When a diagnosis is started in a state where the absorbed $CO_2$ is not sufficiently eliminated after the engine is started, a diagnosis error is increased. Further, when an intake air volume of the engine is large, a ratio of oxygen not absorbed into ceria in the entire oxygen in the intake air is large. Therefore, an error in estimating OSC may be increased. This is more liable to be seen as a problem particularly when exhaust gas recirculation (EGR) is used. Reduction in an absorption rate of $O_2$ is also affected by a temperature of an exhaust gas, which may lead to an error in estimating OSC.

Further, in the OSC method, there are limited opportunities where conditions (such as an intake air volume, a temperature of an exhaust gas, and an engine speed) suited for a diagnosis are satisfied. Specifically, a diagnosis cannot be conducted with sufficient accuracy unless an engine speed is kept high in a certain degree and a vehicle speed is kept substantially constant (e.g., 60 km/h to 90 km/h) for a certain period of time. Meanwhile, for example, in use monitor performance ratios (IUPR) are recommended in some cases. IUPR are such ratios that a diagnosis is properly conducted in three or more times of driving, when ten times of driving are performed. The OSC method described above may not satisfy required IUPR.

As a method for solving the various problems described above, a method of more directly evaluating removal performance is considered. Specifically, a method of measuring a NOx amount on a downstream side of a TWC to estimate a degree of removal of NOx is considered.

According to Japanese Patent Application Laid-Open No. 2010-1781, valve overlap is changed in order to change NOx concentration in an exhaust gas to be supplied to a TWC. Then, deterioration of a catalyst is determined, based on an overlap amount at the time point when an output from a sensor on a downstream side of the TWC reaches a predetermined value. Accordingly, in this method, engine control intended for OBD is performed separately from driving operation of a driver. In other words, active OBD is performed. Active OBD is not preferable from a viewpoint of drivability. Further, a driving state (such as an intake air volume, a temperature of an exhaust gas, and an engine speed) in which such active OBD can be applied is strictly limited, and thus opportunities to conduct a diagnosis are also strictly limited. Therefore, another OBD method is desirable.

Japanese Patent Application Laid-Open No. 2012-219740 discloses a removal performance evaluation method of a catalyst. Specifically, an engine is operated such that an exhaust gas having a rich air-fuel ratio is supplied to a catalyst when an air-fuel ratio of an atmosphere where the catalyst is placed is lean and when the catalyst is within a predetermined temperature range in which the catalyst exhibits catalyst activity. In this state, a NOx removal rate, which is a time-dependent change rate of a NOx concentration reduction amount on a downstream side of a catalyst, is calculated. Further, a NOx removal amount, which is an integrated value of a NOx concentration reduction amount in a predetermined period, is calculated. Based on the NOx removal rate and the NOx removal amount, deterioration of the catalyst is evaluated. In this method, NOx concentration is detected by a NOx sensor.

Japanese Patent Application Laid-Open No. 2004-138486 discloses a NOx sensor that can detect an air-fuel ratio as well as NOx concentration. The NOx sensor has a layered structure made of zirconia oxide as a solid electrolyte having oxygen ion conductivity. In the layered structure, a first chamber, and a second chamber disposed on a downstream side of the first chamber are provided. A pump electrode having low reducibility with respect to NOx is formed on a surface facing the first chamber, in order to remove $O_2$ and detect an air-fuel ratio. The air-fuel ratio is calculated based on an amount of oxygen pumped by the first pump electrode. A pump electrode having high reducibility with respect to NOx is formed on a surface facing the second chamber, in order to detect NOx.

According to a catalytic performance evaluation method described in Japanese Patent Application Laid-Open No. 2012-219740 described above, NOx removal performance of a catalyst is evaluated. However, a phenomenon caused due to deterioration of a catalyst is not only reduction in NOx removal performance. Specifically, deterioration of a catalyst causes such a phenomenon that ammonia ($NH_3$) is more liable to be generated in the catalyst (in particular, in a three way catalyst (TWC)). High concentration of $NH_3$ is toxic, and therefore a catalyst deterioration diagnosis conducted from a viewpoint of $NH_3$ generation may be desired in some cases. Further, even when $NH_3$ generation itself is not seen as a problem, a catalyst deterioration diagnosis conducted from a viewpoint of $NH_3$ generation serves as an effective method, provided that comprehensive performance required for a catalyst can be properly evaluated based on an $NH_3$ generation amount.

To carry out such a method as described above, a gas sensor for detecting $NH_3$ is necessary. If the gas sensor is a gas sensor mainly having sensitivity only to $NH_3$, interference from a component other than $NH_3$ need not be considered. However, preparing a gas sensor only slightly affected by interference between components may be difficult, depending on a composition of an exhaust gas, in particular an oxygen ratio of the exhaust gas. For example, a gas sensor widely used for an automobile as described in Japanese Patent Application Laid-Open No. 2004-138486 described above has sensitivity to both $NH_3$ and NOx. Typically, $NH_3$ in an exhaust gas is changed into NOx in a first chamber of the sensor, which inhibits distinction between $NH_3$ and NOx. This interference property between components leads to reduction in accuracy of a catalyst deterioration diagnosis.

SUMMARY

The present invention is made in order to solve the problems as described above, and has an object to provide a catalyst deterioration diagnosis method with which a catalyst deterioration diagnosis can be conducted with high accuracy from a viewpoint of $NH_3$ generation, and a catalyst deterioration diagnosis system for the catalyst deterioration diagnosis method.

A catalyst deterioration diagnosis method according to the present invention is a method for a system. The system includes a stepped transmission or a continuously variable transmission connected to an internal combustion engine, a catalyst into which an exhaust gas from the internal combustion engine is introduced, and a gas sensor having sensitivity to ammonia that outputs a detection value corresponding to a component of an exhaust gas that has passed through the catalyst. The catalyst deterioration diagnosis method includes the following steps. Monitoring of temporary increase of a detection value of the gas sensor is started, and thereby a temporarily increased amount of the detection value of the gas sensor is acquired. The monitoring is started when upshifting of the stepped transmission or pseudo-upshifting of the continuously variable transmission is performed. Whether or not the temporarily increased amount is larger than a threshold amount is determined.

A catalyst deterioration diagnosis system according to the present invention is a system for diagnosing a degree of deterioration of a catalyst into which an exhaust gas from an internal combustion engine to which a stepped transmission or a continuously variable transmission is connected is introduced. The catalyst deterioration diagnosis system includes a gas sensor, and a control device. The gas sensor has sensitivity to ammonia, and is configured to output a detection value corresponding to a component of an exhaust gas that has passed through the catalyst. The control device is configured to run the internal combustion engine. The control device includes a transmission controller, a monitor unit, and a determination unit. The transmission controller is configured to control operation of the stepped transmission or the continuously variable transmission. The monitor unit is configured to start monitoring of temporary increase of a detection value of the gas sensor, and thereby acquire a temporarily increased amount of the detection value of the gas sensor. The monitor unit is configured to start the monitoring when the transmission controller gives a command of upshifting of the stepped transmission or pseudo-upshifting of the continuously variable transmission. The determination unit is configured to determine whether or not the temporarily increased amount acquired by the monitor unit is larger than a threshold amount.

According to the present invention, a catalyst deterioration diagnosis can be conducted with high accuracy from a viewpoint of $NH_3$ generation. These and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described below with reference to the drawings.

(Configuration)

Figure 1:
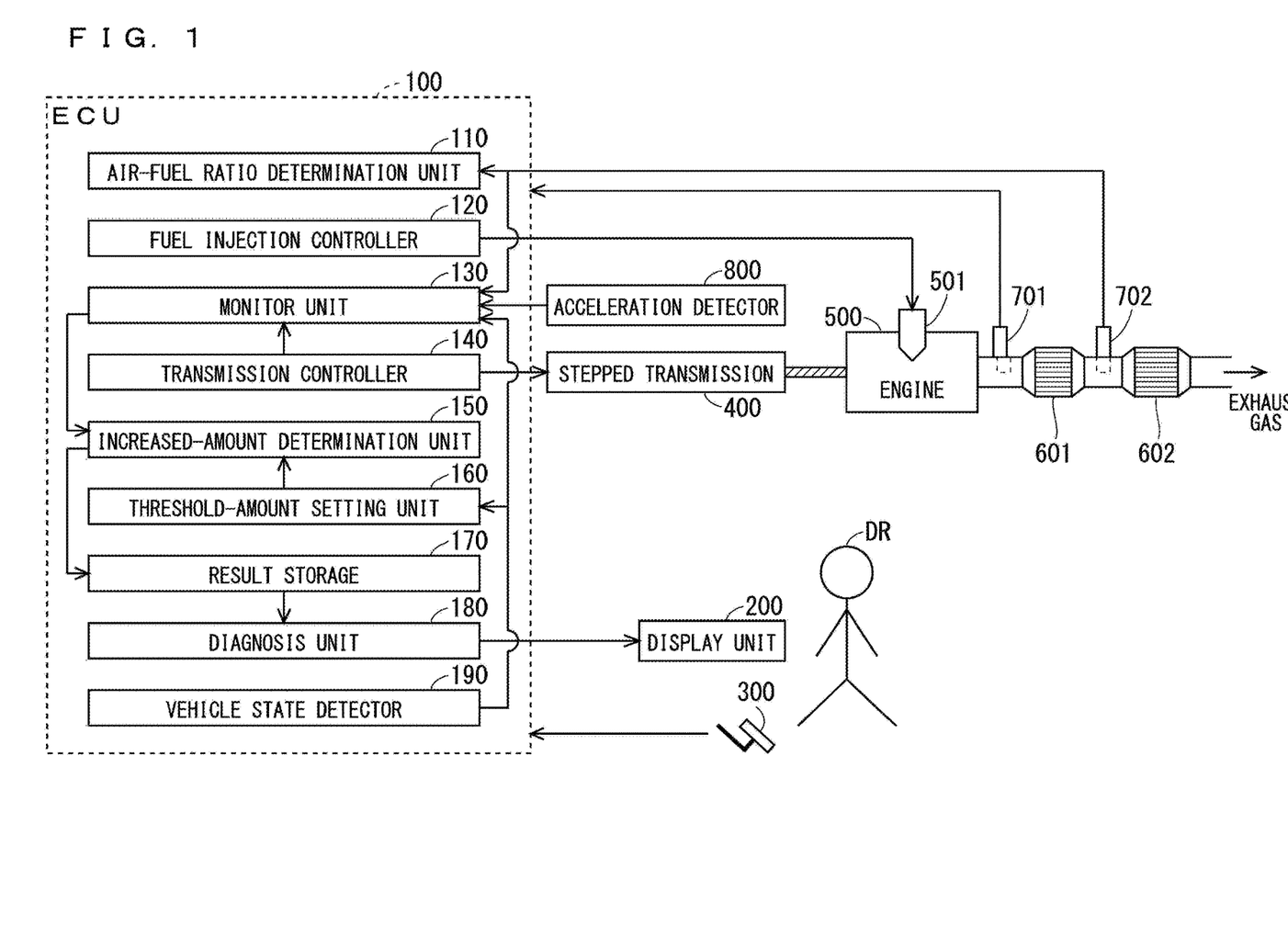
FIG. 1 is a diagram schematically illustrating a configuration of a vehicle according to an embodiment of the present invention.

FIG. 1 is a diagram schematically illustrating a configuration of a vehicle (system) according to this embodiment. In this embodiment, a vehicle is an automobile driven by a driver DR. The automobile includes a gasoline engine 500 (internal combustion engine) including a fuel injection device 501, a stepped transmission 400 connected to the gasoline engine 500, a TWC 601 (catalyst), and a catalyst degradation diagnosis system to be described later.

The vehicle may further include an accelerator pedal 300 (drive operation device) operated by the driver DR, an additional catalyst 602, an air-fuel ratio sensor 701, and an acceleration detector 800. The accelerator pedal 300 is a pedal operated by the driver DR to drive a vehicle. The additional catalyst 602 is disposed on a downstream side of the TWC 601. For example, the additional catalyst 602 is a TWC, a gasoline particulate filter (GPF), or a selective catalytic reduction (SCR) catalyst. The air-fuel ratio sensor 701 is disposed between the gasoline engine 500 and the TWC 601, and is mainly used for control of the gasoline engine 500. The acceleration detector 800 is a device for detecting acceleration of a vehicle. In other words, the acceleration detector 800 is any device that measures a physical quantity with which acceleration can be ultimately calculated. This calculation processing may be performed outside the acceleration detector 800, or may be performed within the catalyst deterioration diagnosis system. Preferably, the acceleration detector 800 is an element that can detect a value corresponding to acceleration by itself, i.e., an acceleration sensor.

The catalyst deterioration diagnosis system is a system for diagnosing a degree of deterioration of the TWC 601, into which an exhaust gas from the gasoline engine 500 is introduced. The catalyst deterioration diagnosis system includes an electronic control unit (ECU) 100 (control device), and a gas sensor 702. The catalyst deterioration diagnosis system may further include a display unit 200. For example, the display unit 200 is a lamp or a display device.

The gas sensor 702 is a sensor for outputting a detection value corresponding to a component of an exhaust gas that has passed through the TWC 601. The gas sensor 702 has sensitivity to $NH_3$. Further, in this embodiment, the gas sensor 702 also has sensitivity to NOx. Specifically, the gas sensor 702 is a sensor that outputs a detection value having sensitivity to both $NH_3$ and NOx. Therefore, when detection of one component is intended, another component may interfere with the detection. This interference property may be caused due to an oxidation reaction in the sensor. Specifically, the oxidation reaction causes $NH_3$ to turn into NOx (typically, NO), inhibiting distinction between both the components. The oxidation reaction may occur particularly at an electrode containing precious metal (e.g., Pt) inside the gas sensor 702. Further, the gas sensor 702 may be a sensor that outputs a detection value indicating an air-fuel ratio, other than the detection values described above.

As a typical example, the gas sensor 702 has a layered structure made of zirconia as a solid electrolyte having oxygen ion conductivity. In the layered structure, a first chamber, and a second chamber disposed on a downstream side of the first chamber are provided. A first pump electrode (e.g., an electrode containing Pt) having low reducibility with respect to NOx is provided on a surface facing the first chamber, in order to remove $O_2$ and detect an air-fuel ratio. The air-fuel ratio is calculated based on an amount of oxygen pumped by the first pump electrode. A second pump electrode (e.g., an electrode containing Rh) having high reducibility with respect to NOx is provided on a surface facing the second chamber. NOx concentration is detected based on an amount of oxygen pumped by the second pump electrode. The second pump electrode has higher reducibility with respect to NOx than the first pump electrode. Note that an auxiliary pump electrode (e.g., an electrode containing Pt) may be additionally provided on a surface facing the second chamber, in order to reduce $O_2$ concentration in the second chamber.

The gas sensor 702 in the example described above is a sensor of a limiting current type, which is widely available as a NOx sensor having $NH_3$ interference property, for example. A NOx sensor of a limiting current type is less liable to be affected by adsorption of a toxic substance. Particularly, a NOx sensor of a limiting current type can be less affected by toxic contamination with sulfur when the NOx sensor of a limiting current type operates in a high temperature. In contrast, for example, an $O_2$ sensor of an electromotive force type easily generates an error due to adsorption of a toxic substance.

The ECU 100 runs the gasoline engine 500. The ECU 100 includes a monitor unit 130, a transmission controller 140, an increased-amount determination unit 150 (determination unit), a threshold-amount setting unit 160, a result storage 170, and a diagnosis unit 180. The ECU 100 may further include an air-fuel ratio determination unit 110, a fuel injection controller 120, and a vehicle state detector 190.

The ECU 100 includes an electric circuit including at least one integrated circuit (IC). The electric circuit includes at least one processor (not shown). Each function of the ECU 100 can be implemented by the processor executing software. The software is described as a program, and is stored in memory (not shown). The memory for storing the program may be included in the ECU 100. For example, the memory is non-volatile or volatile semiconductor memory.

The stepped transmission 400 is a power transmission mechanism that changes a transmission gear ratio in a non-continuous manner. The transmission controller 140 controls operation of the stepped transmission 400. The fuel injection controller 120 controls operation of the fuel injection device 501.

The air-fuel ratio determination unit 110 determines an air-fuel ratio obtained by the gas sensor 702. The air-fuel ratio determined herein may be used for control of a vehicle, for example, together with the air-fuel ratio detected by the air-fuel ratio sensor 701.

When the transmission controller 140 gives a command of upshifting of the stepped transmission 400, the monitor unit 130 starts monitoring temporary increase of a detection value of the gas sensor 702. In this manner, the monitor unit 130 acquires a temporarily increased amount of the detection value of the gas sensor 702. For example, the temporarily increased amount is a maximum value (peak value) of a detection value obtained after starting the monitoring.

In this embodiment, only when upshifting of the stepped transmission 400 is performed during acceleration of a vehicle, the monitor unit 130 starts monitoring temporary increase of the detection value of the gas sensor 702. Whether or not a vehicle is accelerating may be determined based on a detection result of the acceleration detector 800. Note that, as a modification, the monitor unit 130 may start monitoring temporary increase of the detection value of the gas sensor 702 when upshifting of the stepped transmission 400 is performed, regardless of whether or not a vehicle is accelerating.

The monitor unit 130 may be configured to operate only when a state of a vehicle is within a predetermined specified range. The state of a vehicle is acquired from the vehicle state detector 190.

The increased-amount determination unit 150 determines whether or not the temporarily increased amount acquired by the monitor unit 130 is larger than a threshold amount set by the threshold-amount setting unit 160. A determination result is stored in the result storage 170.

The threshold-amount setting unit 160 sets a threshold amount to be used by the increased-amount determination unit 150 in the above described manner. The threshold-amount setting unit 160 may select one amount out of a plurality of predetermined amounts. In this manner, the threshold-amount setting unit 160 may set a threshold amount. Such selection may be performed based on a state of a vehicle when the monitor unit 130 acquires the temporarily increased amount described above. The state of a vehicle is acquired from the vehicle state detector 190. For example, as a fuel injection amount is larger, a higher threshold amount may be set. Note that the threshold amount may be fixed to one value. In such a case, the selection as described above is unnecessary, and the threshold-amount setting unit 160 may be memory (storage) that simply stores one value.

The result storage 170 is memory (storage) that stores a determination result produced by the increased-amount determination unit 150. The diagnosis unit 180 diagnoses whether or not the TWC 601 is excessively deteriorated, based on the determination result stored in the result storage 170. In this case, as necessary, the diagnosis unit 180 may perform statistical processing on the stored determination result. For example, when a ratio of the number of times certain determination results are obtained to the predetermined total number of times determination results are obtained is equal to or larger than a predetermined ratio, the diagnosis unit 180 determines that the TWC 601 is excessively deteriorated. In this example, specifically, the certain determination results suggest that the temporarily increased amount is larger than the threshold amount.

The vehicle state detector 190 is a section that detects a state of a vehicle. The state of a vehicle may include a state of the gasoline engine 500, such as an intake air volume, a fuel injection amount, an engine speed, an EGR rate, and a boost pressure (in a case of a turbo engine). The state of a vehicle may further include a gear selection state of the stepped transmission 400. The above state may be detected by a sensor or the like. Alternatively, the above state may be detected with reference to a detail of a command generated in the ECU 100. For example, a fuel injection amount may be detected with reference to an output of the fuel injection controller 120, and a gear selection state may be detected with reference to an output of the transmission controller 140. Further, the state of a vehicle detected by the vehicle state detector 190 may include a state other than the above state, and may include a speed, acceleration, and a temperature of the TWC 601, for example. A vehicle speed may be detected by a speed detector (not shown). A temperature may be detected by a thermometer (not shown).

(Diagnosis Method)

Figure 2:
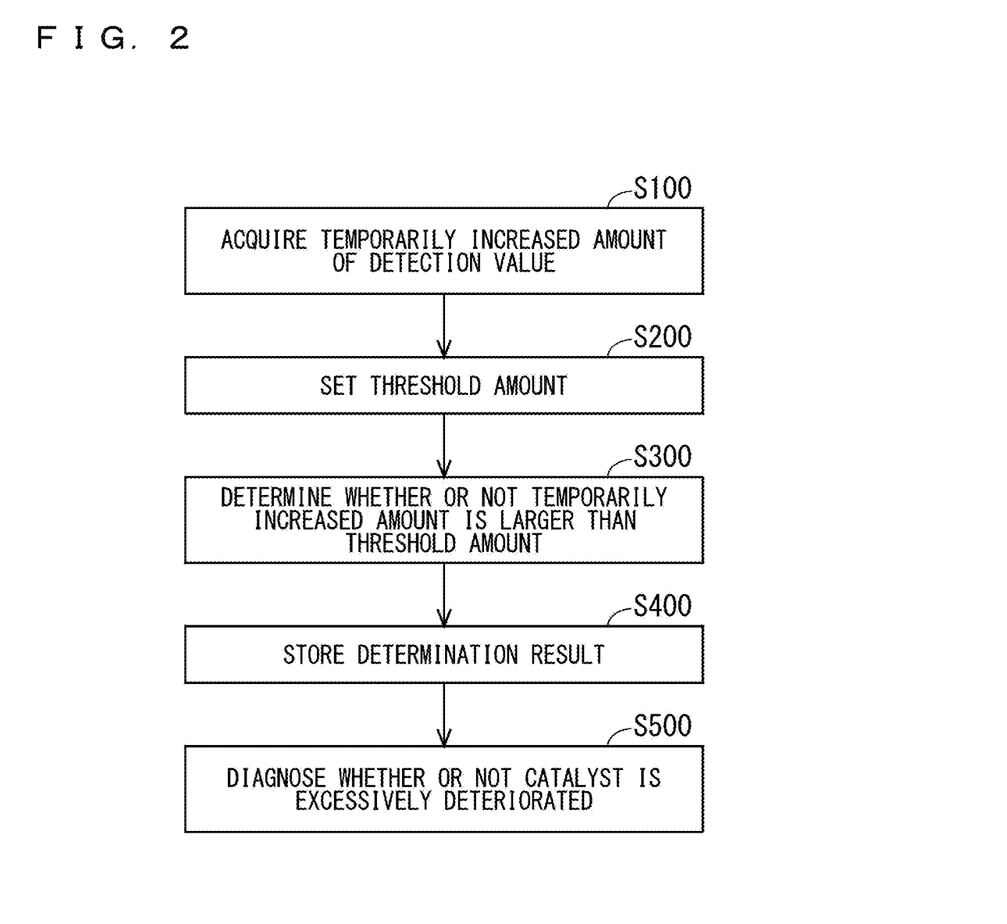
FIG. 2 is a flowchart schematically illustrating a catalyst deterioration diagnosis method according to the embodiment of the present invention.

FIG. 2 is a flowchart schematically illustrating a catalyst deterioration diagnosis method using the above catalyst deterioration diagnosis system according to this embodiment.

In Step S100, the monitor unit 130 acquires a temporarily increased amount of a detection value of the gas sensor 702. Note that a detail of Step S100 will be described later with reference to FIG. 3.

In Step S200, the threshold-amount setting unit 160 sets a threshold amount. The threshold-amount setting unit 160 may select one amount out of a plurality of predetermined amounts. In this manner, the threshold-amount setting unit 160 may set a threshold amount. Such selection may be performed based on a state of a vehicle when the monitor unit 130 acquires the above temporarily increased amount. For example, as a fuel injection amount is larger, a higher threshold amount may be set. Note that the threshold amount may be fixed to one value. In such a case, the selection as described above is unnecessary.

In Step S300, the increased-amount determination unit 150 determines whether or not the temporarily increased amount is larger than the threshold amount. In Step S400, a determination result is stored in the result storage 170.

In Step S500, the diagnosis unit 180 diagnoses whether or not the TWC 601 is excessively deteriorated, based on the determination result stored in the result storage 170. In this case, as necessary, the diagnosis unit 180 may perform statistical processing on the stored determination result. Further, when the number of times of stored determination results is too small, the processing may be brought back to Step S100 from Step S500. In this manner, a determination result may be further acquired. It is preferable that a diagnosis result be displayed by the display unit 200 so as to be notified to the driver DR.

Figure 3:
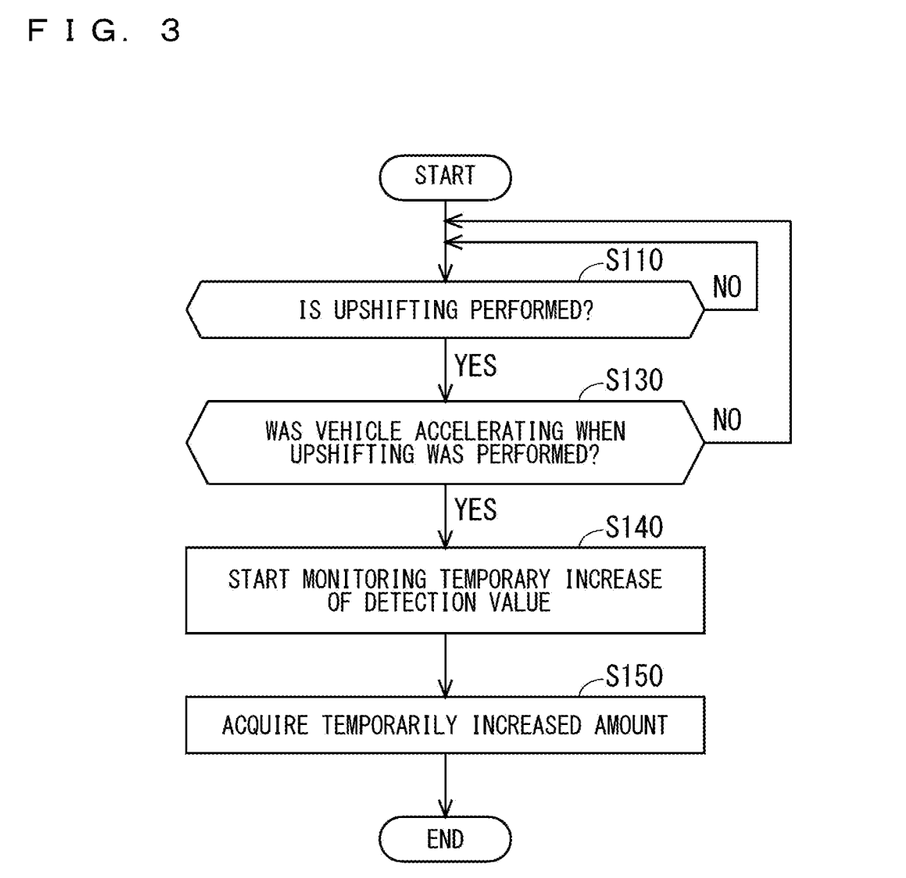
FIG. 3 is a flowchart schematically illustrating a process of acquiring a temporarily increased amount of a detection value of a gas sensor in the catalyst deterioration diagnosis method according to the embodiment of the present invention.

In Step S100 described above, when upshifting of the stepped transmission 400 is performed, monitoring of temporary increase of the detection value of the gas sensor 702 is started. In this manner, a temporarily increased amount of the detection value of the gas sensor 702 is acquired. FIG. 3 is a flowchart schematically illustrating a process for executing Step S100 (FIG. 2).

In Step S110, the monitor unit 130 determines whether or not upshifting of the stepped transmission 400 is performed. In other words, the monitor unit 130 determines whether or not the transmission controller 140 has given a command of upshifting. If upshifting is not performed, the processing returns to Step S110. If upshifting is performed, the processing proceeds to Step S130.

In Step S130, the monitor unit 130 determines whether or not upshifting of the stepped transmission 400 was performed during acceleration of a vehicle. If upshifting was not performed during acceleration of a vehicle, the processing returns to Step S110. If upshifting was performed during acceleration of a vehicle, the processing proceeds to Step S140.

In Step S140, the monitor unit 130 starts monitoring temporary increase of the detection value of the gas sensor 702. Specifically, the monitor unit 130 enters a state of waiting for emergence of temporary increase of the detection value of the gas sensor 702. In Step S130 and Step S140 described above, only when upshifting of the stepped transmission 400 is performed during acceleration of a vehicle, monitoring of temporary increase of the detection value of the gas sensor 702 is started. Note that, as a modification, Step S130 may be omitted. In such a case, monitoring of temporary increase of the detection value of the gas sensor 702 is started when upshifting of the stepped transmission 400 is performed, regardless of whether or not a vehicle is accelerating.

In Step S150, the monitor unit 130 acquires a temporarily increased amount of the detection value of the gas sensor 702. For example, the temporarily increased amount is a maximum value (peak value) of a detection value first obtained after the monitor unit 130 started waiting for emergence of temporary increase of the detection value in Step S140.

Note that Step S140 described above may be executed only when a state of a vehicle is within a predetermined specified range. If a state of a vehicle is not within the predetermined specified range, the processing may return to Step S110.

(Experiment and Analysis)

Figure 4:
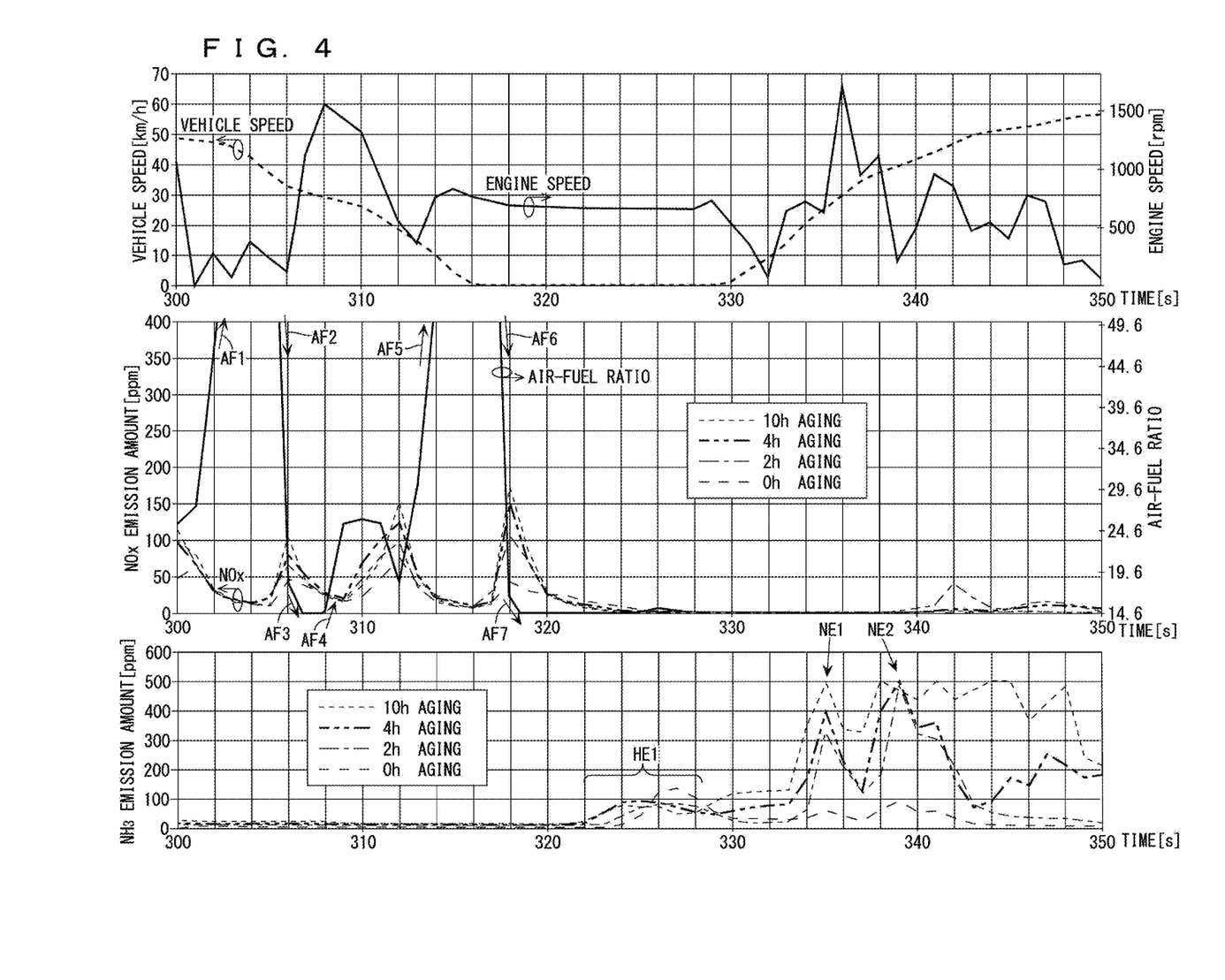
FIG. 4 is a graph showing a measurement result of a vehicle speed, an engine speed, an actual NOx emission amount, an air-fuel ratio, and an actual $NH_3$ emission amount, in a first period of an experiment using a vehicle.
Figure 5:
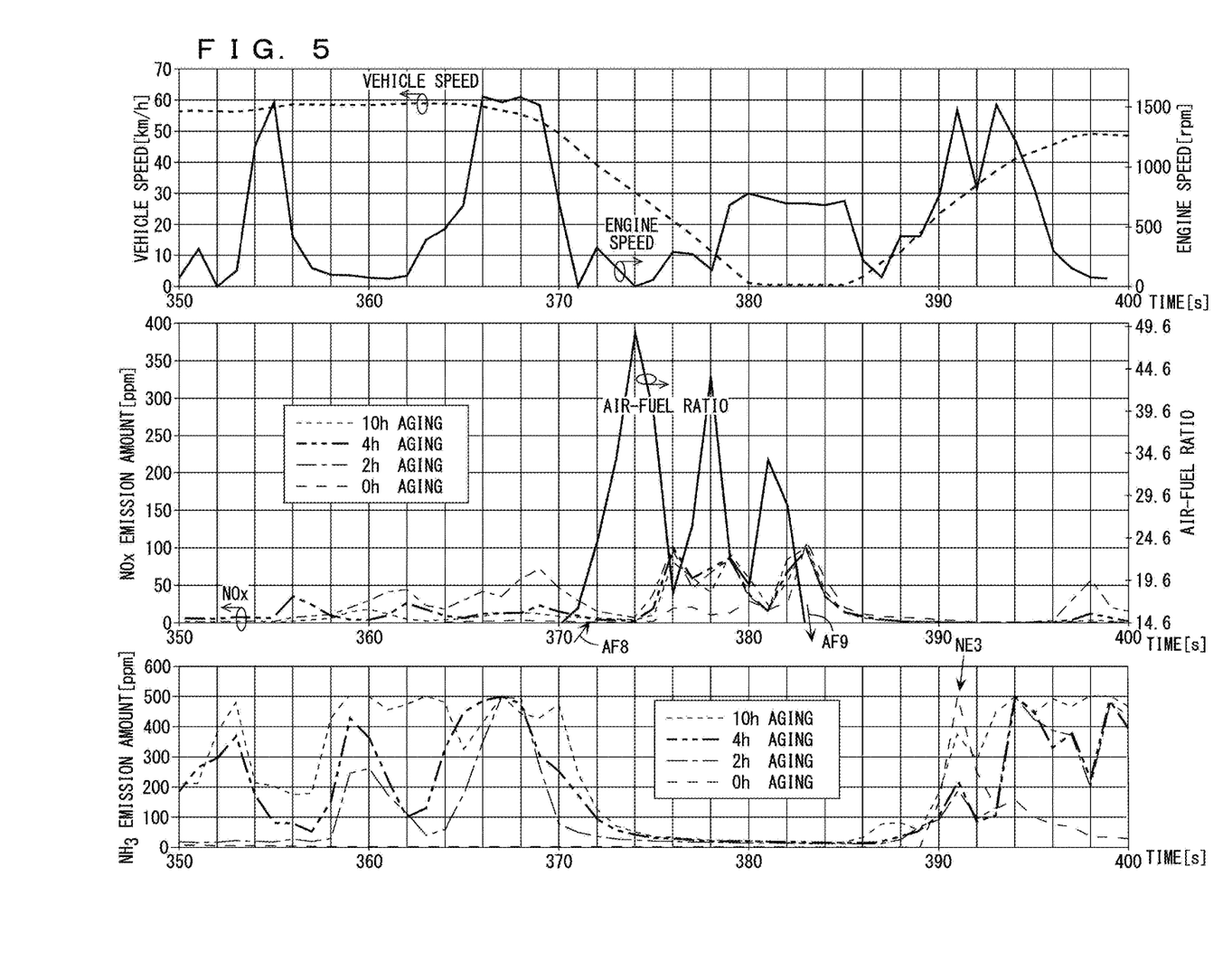
FIG. 5 is a graph showing a measurement result of a vehicle speed, an engine speed, an actual NOx emission amount, an air-fuel ratio, and an actual $NH_3$ emission amount, in a second period of the experiment using a vehicle.
Figure 6:
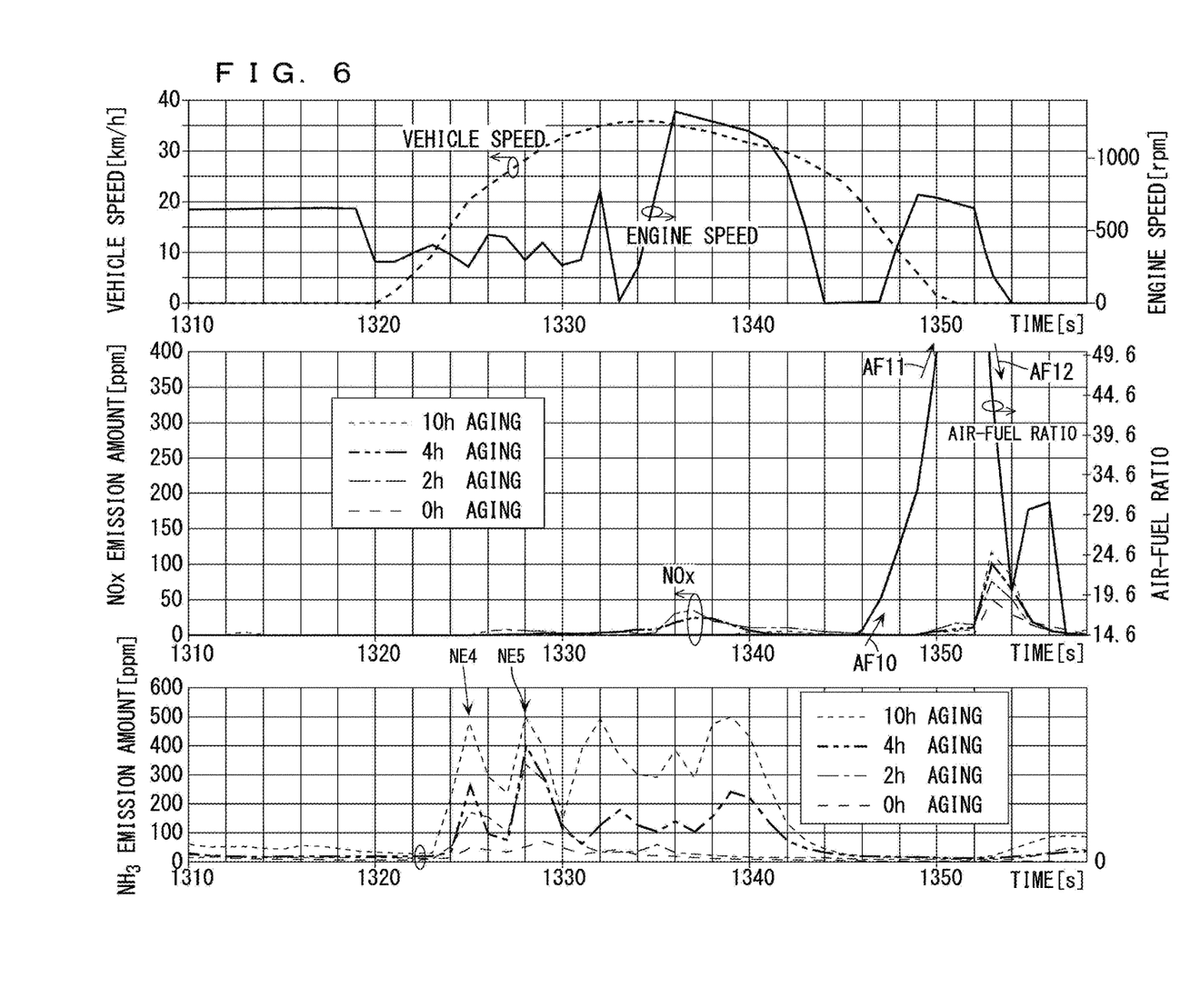
FIG. 6 is a graph showing a measurement result of a vehicle speed, an engine speed, an actual NOx emission amount, an air-fuel ratio, and an actual $NH_3$ emission amount, in a third period of the experiment using a vehicle.

FIG. 4 to FIG. 6 are each a graph showing time-dependent change of a vehicle speed, an engine speed, a NOx emission amount, an air-fuel ratio, and an $NH_3$ emission amount measured in a driving experiment (bench test) of a vehicle including the TWC 601 (FIG. 1). FIG. 4 to FIG. 6 show time-dependent change in first to third periods, respectively. Note that a sampling cycle of each piece of measured data is 1 second (half of a horizontal scale), and obtained data points are connected with a straight line in the graphs.

The NOx emission amount and the $NH_3$ emission amount shown in the graphs are not obtained by the gas sensor 702 (FIG. 1), but are obtained by a gas analyzer installed for the purpose of the experiment at a position on a downstream side of the gas sensor 702. Unlike the gas sensor 702, the gas analyzer does not have interference property between NOx and $NH_3$. Thus, the gas analyzer can invariably detect an actual NOx emission amount and an actual $NH_3$ emission amount. Note that such a gas analyzer not having interference property is a measurement device for an experiment, and it is usually difficult to equip a general automobile with such a gas analyzer.

Four TWCs 601, which had been subjected to hydrothermal aging treatment of 0 h (hour), 2 h, 4 h, and 10 h, were prepared, and a driving experiment was conducted for each of the four TWCs 601. The hydrothermal aging treatment was performed in an atmosphere obtained by mixing 2% of $O_2$ and 10% of $H_2O$ into an inert gas at a temperature of 1000° C., with the use of an electric furnace. As the vehicle including the TWC 601 (FIG. 1), "Golf 7" was used. "Golf 7" is an automobile equipped with a 1.4-liter gasoline engine and a 6-speed automatic transmission, manufactured by Volkswagen in 2014. As for the TWC 601, a genuine product of "Golf 7" was used as well. As a driving mode for the driving experiment, the Federal Test Procedure-75 (FTP-75) defined by the Environmental Protection Agency (EPA) of the United States was used.

In the middle graph in each of FIG. 4 to FIG. 6, a value of an air-fuel ratio detected by the gas sensor 702 is indicated within a range between 14.6 (stoichiometry) and approximately 50. With reference to the middle graphs of FIG. 4 to FIG. 6, each of an arrow AF1, an arrow AF5, and an arrow AF11 indicates a timing when the air-fuel ratio was increased to 50 or larger. Further, each of an arrow AF2, an arrow AF6, and an arrow AF12 indicates a timing when the air-fuel ratio was reduced to less than 50. Further, each of an arrow AF3, an arrow AF7, and an arrow AF9 indicates a timing when the air-fuel ratio was reduced to 14.6 (stoichiometry) or less. Further, each of an arrow AF4, an arrow AF8, and an arrow AF10 indicates a timing when the air-fuel ratio exceeded 14.6 (stoichiometry).

With reference to the lowermost graphs of FIG. 4 to FIG. 6, each of timings NE1 to NE5 corresponds to a timing immediately after upshifting of the stepped transmission 400 (FIG. 1) during acceleration of a vehicle. At the timings NE1 to NE5, temporary increase of a detection value of the gas sensor 702 was detected.

With further reference to the middle graphs of FIG. 4 to FIG. 6, a NOx emission amount was approximately zero at each of the timings NE1 to NE5. Thus, even when the gas sensor 702 (FIG. 1) having interference property between $NH_3$ and NOx is used, $NH_3$ concentration can be detected nearly as accurately as $NH_3$ concentration is detected by the gas analyzer at the timings NE1 to NE5. The table below shows an $NH_3$ emission amount (ppm) detected by the gas analyzer and an output signal (V) from the gas sensor 702 (FIG. 1) at the timings NE1 to NE5.

TABLE 1

| | NH₃ Emission Amount [ppm] | | | | Gas Sensor Output [V] | | | |
|---|---|---|---|---|---|---|---|---|
| | 0 h | 2 h | 4 h | 10 h | 0 h | 2 h | 4 h | 10 h |
| NE1 | 60 | 328 | 396 | 493 | 0.34 | 1.89 | 2.28 | 2.84 |
| NE2 | 91 | 4687 | >500 | >500 | 0.53 | 2.70 | 3.31 | 4.11 |
| NE3 | 156 | >500 | >500 | >500 | 0.90 | 2.89 | 3.39 | 4.23 |
| NE4 | 47 | 169 | 262 | 480 | 0.27 | 0.98 | 1.51 | 2.77 |
| NE5 | 66 | 336 | 398 | >500 | 0.38 | 1.94 | 2.29 | 3.11 |

Note that, in the table above, an $NH_3$ emission amount of ">500" indicates that a detection result obtained by the gas analyzer was above a detection upper limit of 500 ppm.

Figure 7:
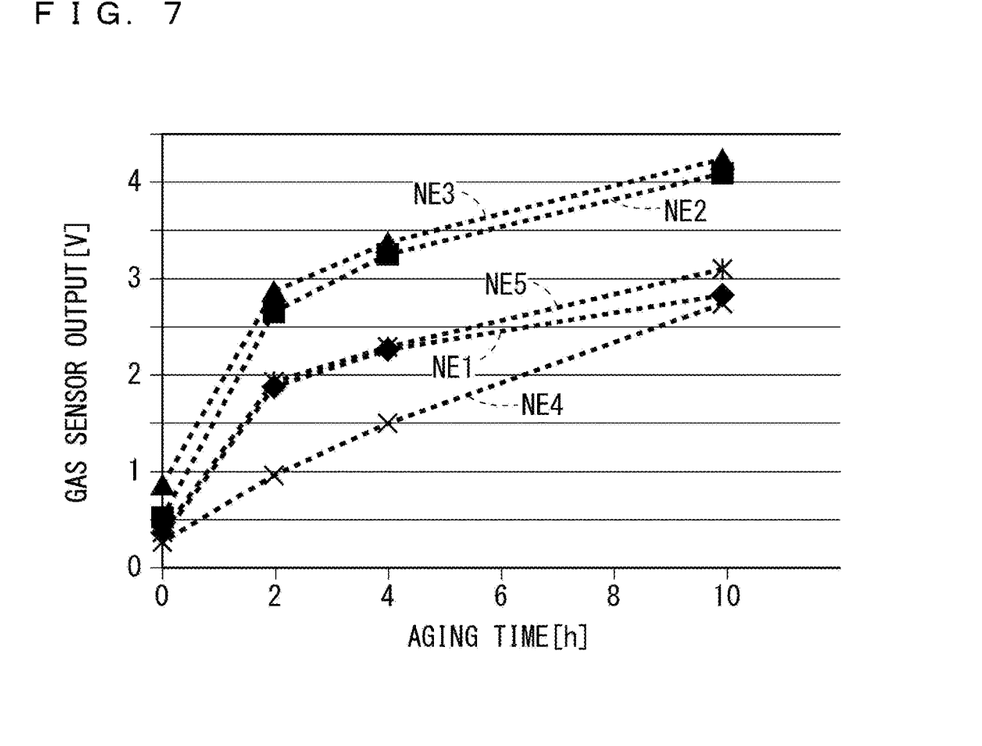
FIG. 7 is a graph showing a correlation between an output of the gas sensor and aging time of a catalyst, in the experiment using a vehicle.

FIG. 7 is a graph showing a relationship between a value of the output signal shown in the table above and aging time of the TWC 601. As can be understood from these results, a sensor output value corresponding to a peak value of an $NH_3$ emission amount was largely proportional to aging time at each of the timings NE1 to NE5.

Based on the results above, it was found that measurement values largely proportional to aging time can be obtained by performing detection with the gas sensor 702 at any of the timings NE1 to NE5. The timings NE1 to NE5 are timings immediately after upshifting of the stepped transmission 400 (FIG. 1) during acceleration of a vehicle. Thus, to obtain a detection value of the gas sensor 702 at the timings NE1 to NE5, monitoring of temporary increase of the detection value of the gas sensor 702 may be started at the time point when upshifting during acceleration of a vehicle is performed. Timings when the detection value has a maximum value after starting monitoring correspond to the timings NE1 to NE5.

Figure 8:
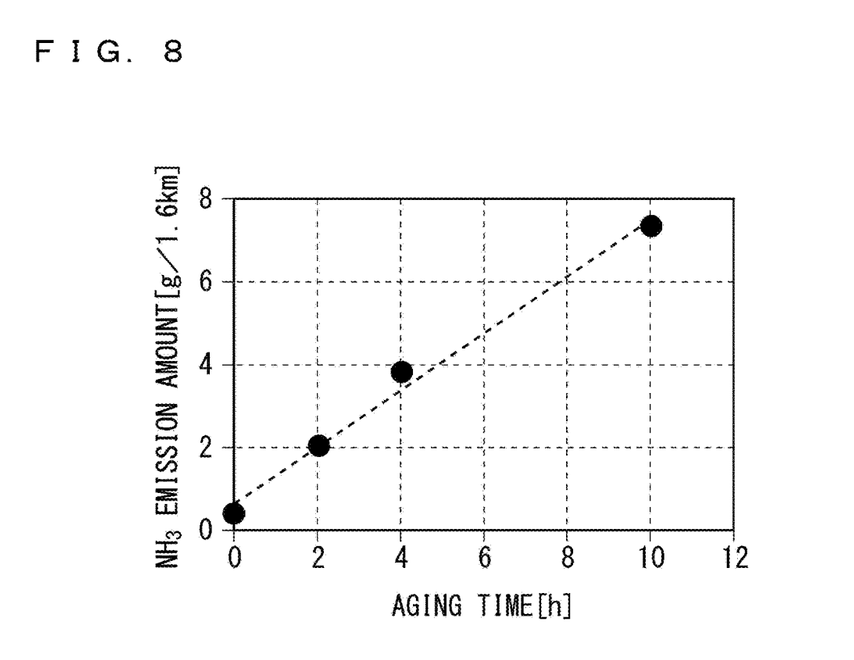
FIG. 8 is a graph showing a correlation between an $NH_3$ emission amount per unit driving distance and the aging time of the catalyst, in the experiment using a vehicle.

FIG. 8 is a graph showing a correlation between the aging time of the TWC 601 and the $NH_3$ emission amount per unit driving distance (1.6 km (1 mile)), in the above experiment. The $NH_3$ emission amount was measured with the gas analyzer (not with the gas sensor 702). As can be understood from these results, there is a considerably high correlation between the $NH_3$ emission amount and the aging time of the TWC. Accordingly, the catalyst deterioration diagnosis conducted from a viewpoint of $NH_3$ generation according to the embodiment described above serves as an effective method used as a method of diagnosing a deterioration state of a TWC, regardless of whether or not $NH_3$ generation itself is seen as a problem.

(Effect)

According to the present embodiment, when upshifting of the stepped transmission 400 is performed, monitoring of temporary increase of a detection value of the gas sensor 702 is started. Then, in this manner, a temporarily increased amount of the detection value is acquired. The temporarily increased amount has a high correlation with deterioration of the TWC 601 from a viewpoint of $NH_3$ generation. Further, by setting a timing of acquiring a temporarily increased amount as described above, the timing of acquiring a temporarily increased amount is shifted to be different from a timing when a large amount of NOx is generated from the TWC 601. With this configuration, interference of NOx in measurement of $NH_3$ concentration is reduced, and therefore $NH_3$ concentration can be more accurately measured. Thus, a catalyst deterioration diagnosis based on $NH_3$ concentration in an exhaust gas that has passed through the TWC 601 can be conducted with high accuracy. Specifically, a catalyst deterioration diagnosis can be conducted with high accuracy from a viewpoint of $NH_3$ generation.

In comparison with the OSC method described above, the diagnosis according to this embodiment is based on $NH_3$ concentration, and therefore a diagnostic result more directly reflecting a generation amount of $NH_3$ can be obtained. Further, the diagnosis according to this embodiment can be conducted in a shorter period (typically, 1 second or less), as compared to the OSC method.

Oxygen concentration in an exhaust gas from the gasoline engine 500 is extremely low, as compared to a diesel engine. In such a case, a sensor of a mixed potential type, which is widely used for detection of $NH_3$, is not suitable. According to this embodiment, interference from a component other than $NH_3$ can be reduced, with the use of a sensor suited for an atmosphere having low oxygen concentration. Specifically, interference from a component other than $NH_3$ can be reduced, with the use of a sensor of a limiting current type. The sensor of a limiting current type is typically a multi-chamber sensor. For example, $NH_3$ can be detected by utilizing $NH_3$ interference property of a widely used multi-chamber NOx sensor. The use of a NOx sensor not only enables detection of $NH_3$, but also enables detection of NOx, which is one of major regulated substances. Note that a similar effect can be achieved also when a natural gas engine is used instead of the gasoline engine 500.

Upshifting in a vehicle is usually performed during acceleration. For some unknown reason, however, upshifting in a vehicle may be performed during non-acceleration. At the time of upshifting during non-acceleration, it is likely that $NH_3$ is not generated as $NH_3$ is generated during acceleration. Thus, it is preferable that monitoring of temporary increase of a detection value of the gas sensor 702 be started only at the time of upshifting during acceleration.

Upshifting of the stepped transmission 400 due to acceleration of a vehicle frequently occurs in usual driving of a vehicle. Thus, when monitoring of temporary increase of a detection value of the gas sensor 702 is started at the time of such upshifting, the catalyst deterioration diagnosis can be conducted with high frequency. Further, this catalyst deterioration diagnosis is suitable to be conducted as passive OBD, which is a type of OBD in which intentional engine control intended for OBD is not performed. Further, at the time of upshifting during deceleration, a state of a vehicle can easily achieve a state close to a predetermined state. Particularly, in an automatic transmission vehicle, upshifting during acceleration can be performed when a processor of the ECU 100 executes a specific program. Accordingly, variation in states of a vehicle at the time of OBD is relatively small. Thus, variation in a correlation coefficient between a temporarily increased amount of a detection value of the gas sensor 702 and a degree of deterioration of the gas sensor 702, which is caused by a difference in states of a vehicle, can be reduced. Consequently, accuracy of the catalyst deterioration diagnosis can be further enhanced.

A threshold amount to be compared to a temporarily increased amount in the increased-amount determination unit 150 may be set based on a state of a vehicle when a temporarily increased amount of a detection value of the gas sensor 702 is acquired. With this configuration, a difference in a correlation coefficient between a temporarily increased amount of a detection value and a degree of deterioration of the gas sensor 702, which is caused by a difference in states of a vehicle, can be corrected. Consequently, accuracy of the catalyst deterioration diagnosis can be further enhanced.

Monitoring of temporary increase of a detection value of the gas sensor 702 may be started only when a state of a vehicle is within a predetermined specified range. In this case, variation in a correlation coefficient between a temporarily increased amount of a detection value and a degree of deterioration of the gas sensor 702, which is caused by a difference in states of a vehicle, can be reduced. Consequently, accuracy of the catalyst deterioration diagnosis can be further enhanced.

(Modification of Transmission)

Instead of the stepped transmission 400 (FIG. 1), a continuously variable transmission (CVT) may be used. Unlike the stepped transmission 400, the CVT is a power transmission mechanism that can change a transmission gear ratio in a continuous manner. In a vehicle including a CVT, a discrete change in a gear ratio similar to a gear change performed by the stepped transmission 400 may be implemented through control performed over the CVT by the ECU, in a manner simulating the gear change of the stepped transmission 400. Upshifting implemented with this method in such a simulating manner is herein referred to as pseudo-upshifting. Particularly, in a vehicle including paddle shifters, pseudo-upshifting can be performed in response to operation performed on the paddle shifters by the driver DR (FIG. 1).

In this modification, when the transmission controller 140 gives a command of pseudo-upshifting of a continuously variable transmission, the monitor unit 130 starts monitoring temporary increase of a detection value of the gas sensor 702. Specifically, only when pseudo-upshifting of a continuously variable transmission is performed during acceleration of a vehicle, the monitor unit 130 starts monitoring temporary increase of a detection value of the gas sensor 702. Note that the monitor unit 130 may start monitoring temporary increase of a detection value of the gas sensor 702 when pseudo-upshifting of a continuously variable transmission is performed, regardless of whether or not a vehicle is accelerating.

(Other Modification)

In the embodiment described above, a catalyst deterioration diagnosis of the TWC 601 (FIG. 1) is conducted. However, in addition to or instead of the catalyst deterioration diagnosis of the TWC 601, a catalyst deterioration diagnosis of the additional catalyst 602 may be conducted with a method similar to that in the embodiment described above.

The embodiment described above gives description of a case where a vehicle is driven by a driver DR. However, a vehicle may be automatically driven. In such a case, the display unit 200 may be provided to display information for an occupant (not the driver DR), or the display unit 200 may be omitted. Further, when a vehicle is automatically driven, the accelerator pedal 300 may be omitted.

While the invention has been shown and described in detail, the foregoing description is in all aspects illustrative and not restrictive. It is therefore understood that numerous modifications and variations not illustrated herein can be devised without departing from the scope of the invention.

What is claimed is:

1. A catalyst deterioration diagnosis method for a system that includes an internal combustion engine to which a stepped transmission or a continuously variable transmission is connected, an electronic control unit (ECU) configured to run the internal combustion engine, a transmission controller configured to control operation of the stepped transmission or the continuously variable transmission, a catalyst into which an exhaust gas from the internal combustion engine is introduced, a gas sensor having sensitivity to ammonia that outputs a detection value corresponding to a component of an exhaust gas that has passed through the catalyst, and a processor coupled to a memory storing instructions that when executed by the processor, configure the processor to perform the steps of:

the transmission controller giving a command of upshifting the stepped transmission or pseudo-upshifting the continuously variable transmission;

starting monitoring of temporary increase of a detection value of the gas sensor, and thereby acquiring a temporarily increased amount of the detection value of the gas sensor, the monitoring being started when the command for upshifting of the stepped transmission or the pseudo-upshifting of the continuously variable transmission is given the transmission controller; and determining whether or not the temporarily increased amount of the detection value of the gas sensor that is acquired is larger than a threshold amount.

2. The catalyst deterioration diagnosis method according to claim 1, wherein the internal combustion engine is a gasoline engine or a natural gas engine.

3. The catalyst deterioration diagnosis method according to claim 1, wherein the gas sensor has sensitivity to nitrogen oxide.

4. The catalyst deterioration diagnosis method according to claim 1, wherein the catalyst is a three way catalyst.

5. The catalyst deterioration diagnosis method according to claim 1, wherein the system is a vehicle, and in the step of starting monitoring of the temporary increase of the detection value of the gas sensor, the monitoring of the temporary increase of the detection value of the gas sensor is started only when upshifting of the stepped transmission or pseudo-upshifting of the continuously variable transmission is performed during acceleration of the vehicle.

6. The catalyst deterioration diagnosis method according to claim 1, wherein the system is a vehicle, and the catalyst deterioration diagnosis method further comprises the step of setting the threshold amount, based on a state of the vehicle when the acquiring of the temporarily increased amount of the detection value of the gas sensor is performed.

7. The catalyst deterioration diagnosis method according to claim 1, wherein the system is a vehicle, and in the step of starting monitoring of the temporary increase of the detection value of the gas sensor, the monitoring of the temporary increase of the detection value of the gas sensor is started only when a state of the vehicle is within a predetermined specified range.

8. A catalyst deterioration diagnosis system that diagnoses a degree of deterioration of a catalyst into which an exhaust gas from an internal combustion engine to which a stepped transmission or a continuously variable transmission is connected is introduced, the catalyst deterioration diagnosis system comprising:

a gas sensor having sensitivity to ammonia, and being configured to output a detection value corresponding to a component of an exhaust gas that has passed through the catalyst; and an electronic control unit (ECU) configured to run the internal combustion engine, the ECU including:

a transmission controller configured to control operation of the stepped transmission or the continuously variable transmission; and a processor coupled to a memory storing instructions that when executed by the processor configure the processor to:

start monitoring of a temporary increase of a detection value of the gas sensor, and thereby acquire a temporarily increased amount of the detection value of the gas sensor, wherein the monitoring is started when the transmission controller gives a command of upshifting of the stepped transmission or pseudo-upshifting of the continuously variable transmission; and determine whether or not the temporarily increased amount of the detection value of the gas sensor that is acquired is larger than a threshold amount.

9. The catalyst deterioration diagnosis system according to claim 8, wherein
the internal combustion engine is a gasoline engine or a natural gas engine.

10. The catalyst deterioration diagnosis system according to claim 8, wherein
the gas sensor has sensitivity to nitrogen oxide.

11. The catalyst deterioration diagnosis system according to claim 8, wherein
the catalyst is a three way catalyst.

12. The catalyst deterioration diagnosis system according to claim 8, wherein
the catalyst deterioration diagnosis system is a system for a vehicle, and
the processor is further configured to start the monitoring of the temporary increase of the detection value of the gas sensor only when upshifting of the stepped transmission or pseudo-upshifting of the continuously variable transmission is performed during acceleration of the vehicle.

13. The catalyst deterioration diagnosis system according to claim 8, wherein
the catalyst deterioration diagnosis system is a system for a vehicle, and
the processor is further configured to determine a threshold-amount based on a state of the vehicle when the temporarily increased amount of the detection value of the gas sensor is acquired.

14. The catalyst deterioration diagnosis system according to claim 8, wherein
the catalyst deterioration diagnosis system is a system for a vehicle, and
the processor is further configured to start the monitoring unit only when a state of the vehicle is within a predetermined specified range.

\* \* \* \* \*